United States Patent
Zhang et al.

(10) Patent No.: US 6,193,907 B1
(45) Date of Patent: *Feb. 27, 2001

(54) OXYGEN GENERATING FORMULATION WITH HIGH STRUCTURAL INTEGRITY

(75) Inventors: Yunchang Zhang, Overland Park; Girish S. Kshirsagar, Lenexa; James C. Cannon, Overland Park, all of KS (US)

(73) Assignee: Be Intellectual Property, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,636

(22) Filed: Apr. 7, 2000

Related U.S. Application Data

(63) Continuation of application No. 09/016,110, filed on Jan. 30, 1998.

(51) Int. Cl.[7] .................... C01B 11/14; C01B 11/18; A62B 7/08; A62B 21/00
(52) U.S. Cl. .................... 252/187.31; 252/187.1; 422/126
(58) Field of Search .................... 252/187.31, 187.1; 422/126

(56) References Cited

U.S. PATENT DOCUMENTS

| | | | |
|---|---|---|---|
| 4,073,741 | 2/1978 | Heintz | 252/187.31 |
| 5,198,147 | 3/1993 | Zhang et al. | 252/187.31 |
| 5,279,761 | 1/1994 | Zhang et al. | 252/187.31 |
| 5,298,187 | * 3/1994 | Zhang et al. | 252/187.31 |
| 5,338,516 | 8/1994 | Zhang et al. | 422/126 |
| 5,783,105 | 7/1998 | Zhang et al. | 252/187.31 |
| 5,882,545 | 3/1999 | Zhang et al. | 252/187.31 |
| 6,007,736 | * 12/1999 | Zhang et al. | 252/187.31 |
| 6,030,583 | * 2/2000 | Kshirsager et al. | 422/126 |
| 6,054,067 | * 4/2000 | Zhang et al. | 252/187.31 |

FOREIGN PATENT DOCUMENTS

| | | |
|---|---|---|
| WO 93/17961 | 9/1993 | (WO) . |
| WO 97/17282 | 5/1997 | (WO) . |
| WO 97/43209 | 11/1997 | (WO) . |
| WO 97/43210 | 11/1997 | (WO) . |

* cited by examiner

*Primary Examiner*—Joseph D. Anthony
(74) *Attorney, Agent, or Firm*—Fulwider Patton Lee & Utecht, LLP

(57) ABSTRACT

The chlorate/perchlorate based oxygen generating compositions contain about 0.5–15% by weight of metal powder for use as a fuel selected from the group consisting of iron, nickel, cobalt and mixtures thereof; about 0.1% to about 15% by weight of at least one transition metal oxide catalyst; greater than 5% to about 25% by weight of an alkali metal silicate as a reaction rate and core rheology modifier, binder and chlorine suppresser; and the remainder substantially comprising an oxygen source selected from the group consisting of alkali metal chlorates, alkali metal perchlorates, and mixtures thereof. The alkali metal silicate can be selected from the group consisting of sodium metasilicate, sodium orthosilicate, lithium metasilicate, potassium silicate, and mixtures thereof. The oxygen generating composition can also optionally contain a binder selected from the group consisting of glass powder, fiber glass and mixtures thereof.

5 Claims, 1 Drawing Sheet

OXYGEN GENERATING FORMULATION WITH HIGH STRUCTURAL INTEGRITY

RELATED APPLICATION

This is a continuation of Ser. No. 09/016,110 filed Jan. 30, 1998 now allowed.

BACKGROUND OF THE INVENTION

1. Field of the Invention

This invention relates generally to oxygen generating compositions, and more particularly concerns improved low temperature sensitivity oxygen generating compositions including iron, nickel, or cobalt powder as a fuel, a transition metal oxide as a catalyst, and a sodium silicate as a reaction rate and rheology modifier and chlorine suppresser.

2. Description of Related Art

Chemical oxygen generators are typically used in situations requiring emergency supplemental oxygen, such as in aviation, in submarines, diving and mountain climbing, for example, and in other similar settings where it is useful to furnish a convenient reliable supply of oxygen gas of breathable quality. Oxygen for such purposes must be of suitably high purity. For example, the requirements of SAE Aerospace Standard AS801OC are frequently applicable to oxygen utilized in aviation applications. Chemical oxygen generating compositions based upon the decomposition of alkali metal chlorates or perchlorates have long been used as an emergency source of breathable oxygen in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference.

Oxygen generating compositions are commonly required to function within a wide range of environmental temperatures, as low as −30° and as high as 60° C., for example. Since the rate of decomposition of sodium chlorate is temperature dependent, an excess weight of the chemical oxygen generating composition is commonly used in order to insure that a sodium chlorate based composition will meet minimum oxygen generating specifications at both low and high temperatures. It would be desirable to provide oxygen generating compositions that are less temperature sensitive and can provide a more uniform rate of oxygen generation over an operating range of temperatures.

A chemical oxygen genrating candle or core typically has several layers. When the oxygen generating reaction is initiated at one end of the core, the reaction front typically propagates along the longitudinal axis through the layers toward the other end of the core as oxygen is generated. Ideally, the reaction zone should move at a steady, repeatable rate governed by the amounts of fuel and catalyst in the layers along the length of the core. In practice, however, the behavior of the oxygen generating reaction can be far from this ideal.

When expended chemical core residues are visually examined, several conditions can be observed which indicate behavior that occurred during the oxygen generating reaction. When the oxygen generating reaction has evolved at a steady and smooth rate, the pores left in the residue are typically small and uniform. The presence of large cavities typically indicate the formation of very large bubbles associated with very large bursts of oxygen release. Such large bubbles tend to perturb heat transfer into other regions of the core, and can result in a large burst of oxygen release follow by a temporary sharp decline or dip in oxygen evolution. Gross physical distortion in the shape of the residue, relative to the shape of the unreacted core, can be evidence of a very runny reaction zone that can result in possible mechanical failure of the core in the event of exposure of the core to severe vibration during operation of the oxygen generator. On the other hand, relatively uniform, laminar patterns of pores in the residue is suggestive of a well ordered reaction zone. The presence of irregular swirls in the residue can indicate that the reaction zone was severely disturbed and may have mechanically collapsed, which can also be correlated with an irregular flow of oxygen.

The various reaction behaviors that are observable in the residues of oxygen generation cores are related to the melt properties of the core. The reaction temperature can reach 500° C. or higher inside an operating chemical oxygen generating core. Because sodium chlorate melts at about 265° C., during operation of the oxygen generator, sodium chlorate can melt in an unconstrained manner and form puddles that can cause the core to collapse. Unconstrained melting, puddling, and collapsing of the core can result in a disorganized, irregular reaction front and an irregular oxygen generation rate, causing variation in performance from core to core, and causing the oxygen generation rate and the rate at which the reaction zone moves to be more temperature dependent. Melting of the oxygen generating core under such conditions can also make the core vulnerable to high intensity vibrations. The forces exerted by evolving gas during solid phase decomposition of the oxygen generating reaction mixture can also cause the partially decomposed or undecomposed portion of the core to crack, resulting in an erratic oxygen generation rate. This phenomenon is particularly likely at lower environmental temperatures. Since a minimum oxygen flow and a minimum duration are required at all operating temperatures, a heavier core is commonly needed to insure that the oxygen flow curve does not dip below the required minimum specification for operation under cold conditions, and that the duration is longer than the required minimum specification for hot conditions.

In addition, when chemical cores melt in an unconstrained way, the melted material can come in contact with the oxygen generator housing, resulting in hot spots on the generator wall, which can result in temperatures that exceed applicable performance specifications. The duration of oxygen generation can also be much shorter at higher temperatures due to a poorly organized reaction zone, which can have a larger reacting volume than expected. Unfortunately, in conventional oxygen generating candles, providing a suitable performance across the full range of environmental temperatures in which the oxygen generator is to be used typically is accomplished by increasing the core weight to offset temperature dependence, to insure that both required minimum flow rates in colder temperatures and minimum duration specifications at high temperatures are met. It would therefore be desirable to provide an alternative solution to these problems that does not require increasing the core weight.

Iron fueled oxygen generating compositions utilizing alkali metal chlorates or perchlorates as oxygen generating sources commonly include calcium hydroxide or lithium peroxide as rate modifiers. Calcium hydroxide and lithium peroxide are very strong inhibitors of the decomposition of sodium chlorate, so that only small amounts can be used, making it necessary to perform a prolonged mixing to uniformly distribute these minor ingredients in sodium chlorate.

Iron fueled oxygen generating compositions utilizing alkali metal chlorates or perchlorates as oxygen generating sources are known that can include sodium silicates, such as sodium metasilicate or sodium orthosilicate to smooth out the chlorate decomposition and to suppress free chlorine formation. However, when used in combination with iron powder as a fuel, commonly only about 1% loading of sodium silicates is needed for these purposes, and the loading of sodium silicates commonly does not exceed 5%.

It is desirable to provide oxygen generating cores that do not melt in an unconstrained manner to form puddles, and that retain their structural integrity and shape during operation of the oxygen generator, allowing reduction or elimination of preformed insulation layers that are commonly used to increase the mechanical integrity of the operating core. It would be desirable to provide oxygen generating compositions that have lower sensitivity to environmental temperatures, and that are structurally more robust to withstand high levels of vibration during operation. It would also be desirable to reduce the probability of a localized high temperature spot on the generator wall, to lower the maximum wall temperature during operation. It would further be desirable to provide oxygen generating compositions that produce smoother oxygen flow curves and have lower temperature sensitivity. The present invention meets these needs.

SUMMARY OF THE INVENTION

Briefly, and in general terms, the present invention provides for improved chlorate/perchlorate based oxygen generating compositions including iron, nickel or cobalt powder as a fuel, a transition metal oxide as a catalyst, and a sodium silicate. The oxygen generating compositions utilize sodium silicate as a reaction rate modifier and a binder, so that the sodium silicate can be used to replace calcium hydroxide and glass powder in chemical oxygen generating compositions. In addition, sodium silicate functions as a very good rheology modifier. The oxygen generating composition of the invention has lower sensitivity to environmental temperatures, smoother oxygen generating, and is structurally more robust to withstand high levels of vibration during operation.

The invention accordingly provides for an oxygen generating composition for producing a breathable gas upon ignition of the composition, comprising about 0.5–15% by weight of metal powder for use as a fuel selected from the group consisting of iron, nickel, cobalt and mixtures thereof; about 0.1% to about 15% by weight of at least one transition metal oxide catalyst; greater than 5% to about 25% by weight of an alkali metal silicate as a reaction rate and core rheology modifier and chlorine suppresser; and the remainder substantially comprising an oxygen source selected from the group consisting of alkali metal chlorates, alkali metal perchlorates, and mixtures thereof. In one presently preferred embodiment, the transition metal oxide catalyst is selected from the group consisting of cobalt oxide, copper oxide, nickel oxide, iron oxide, manganese oxide, and mixtures thereof. In another preferred aspect of the invention the oxygen generating composition contains about 6–10% alkali metal silicate that is selected from the group consisting of sodium metasilicate, sodium orthosilicate, lithium metasilicate, potassium silicate, and mixtures thereof. The oxygen generating composition can also optionally contain a binder selected from the group consisting of glass powder, fiber glass and mixtures thereof.

When sodium metasilicate is used, the oxygen generating cores do not melt in an unconstrained manner to form puddles, and they do not collapse even during operation at high environment temperatures. The cores retain their structural integrity and shape during operation of the oxygen generator, and the potential for vibration failure can be avoided. In addition, the need for preformed insulation layers used to increase the mechanical integrity of the operating core can be reduced or eliminated.

These and other aspects and advantages of the invention will become apparent from the following detailed description and the accompanying drawing, which illustrates by way of example the features of the invention.

DETAILED DESCRIPTION OF THE PREFERRED EMBODIMENTS

Figure 1:
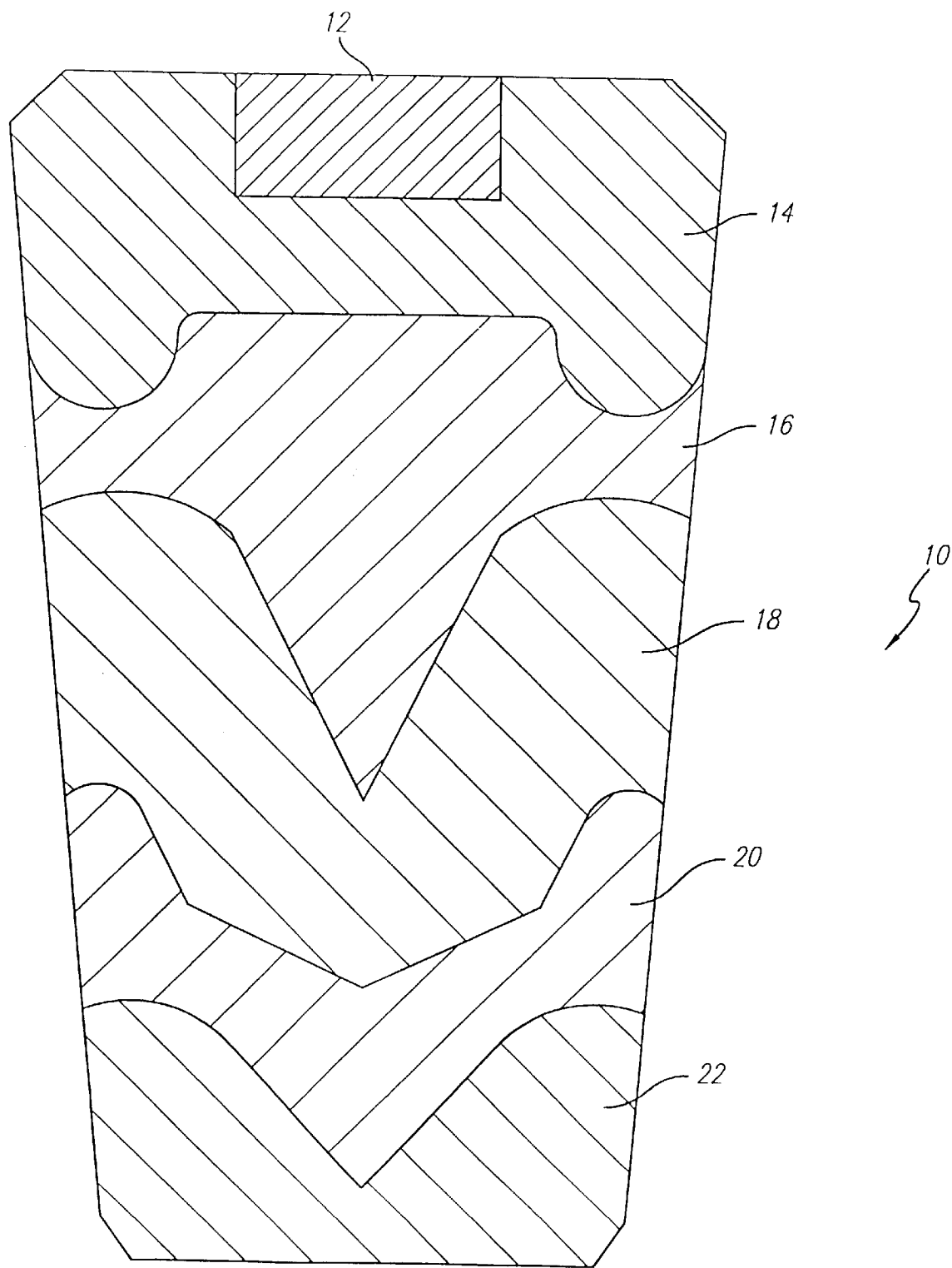
FIG. 1 is a cross sectional view of an oxygen generating candle formed from the oxygen generating composition according to the principles of the invention.

The reaction temperature in an operating chemical oxygen generating core can cause sodium chlorate in an operating chemical oxygen generating core to melt in an unconstrained manner and form puddles that can cause the core to collapse. This can result in a disorganized, irregular reaction front and an irregular oxygen generation rate, causing variation in performance from core to core, and can make the oxygen generation rate and the rate at which the reaction zone moves more temperature dependent. At lower temperatures, solid phase decomposition of the oxygen generating reaction mixture can also cause the undecomposed portion of the core to crack, resulting in an erratic oxygen generation rate. In addition, melted chemical core material can come in contact with the oxygen generator housing, resulting in hot spots on the oxygen generator wall. The duration of oxygen generation can also be much shorter at higher temperatures due to a poorly organized reaction zone.

The oxygen generating formulation of the invention is accordingly comprised of an alkali metal chlorate or perchlorate, or a mixture thereof, as an oxygen source, a transition metal oxide as a catalyst, a metal powder for use as a fuel selected from the group consisting of iron, nickel and cobalt, and an alkali metal silicate as a reaction rate and core rheology modifier and chlorine suppresser. The loading of the alkali metal silicate is preferably greater than 5% and up to about 25%, and in a presently preferred embodiment, the loading of the silicate is in the range of about 6% to about 10%. The oxygen source is preferably selected from sodium chlorate, potassium perchlorate, lithium perchlorate, and mixtures thereof. Sodium chlorate is currently preferred.

The oxygen generating compositions of the invention contain about 0.5–15% by weight of metal powder for use as a fuel. Iron powder is preferably used as a fuel to supply heat to sustain the decomposition of the sodium chlorate, although cobalt powder and nickel powder can also be used as fuels.

The oxygen generating compositions of the invention also advantageously contain about 0.1% to about 15% by weight of at least one transition metal oxide catalyst. The transition metal oxide catalyst is preferably selected from the group consisting of cobalt oxide, copper oxide, nickel oxide, iron oxide, manganese oxide, and mixtures thereof. Cobalt oxide, nickel oxide and copper oxide are currently preferred.

The oxygen generating compositions of the invention also preferably contain more than 5%, and up to about 25% by weight of an alkali metal silicate as a reaction rate and core rheology modifier and chlorine suppresser. In order to improve rheology and structural robustness, preferably 6% to 10% sodium silicate, and more preferably 6% to 7%, is used.

The most common preferred alkali metal silicates are sodium metasilicate, $Na_2SiO_3$, and sodium orthosilicate, $Na_4SiO_4$. Granular anhydrous sodium metasilicate available from Alfa Chemical, Aldrich Chemical, and Van Waters & Rogers are suitable. In one currently preferred embodiment, granular anhydrous sodium metasilicate is ground to pass 60 mesh sieve to facilitate mixing, and although more finely ground powder will be more effective, and coarser powder will be less effective, granular anhydrous sodium metasilicate that is finer or coarser can be expected to work, and may also be suitable. Hydrated sodium silicate is more expensive, but may also be suitable. The $Na_2O/SiO_2$ ratios for sodium metasilicate and sodium orthosilicate are 1:1 and 2:1, respectively, and sodium silicates with a $Na_2O/SiO_2$ ratio between 1:1 and 2:1 should also be suitable. Other alkali metal silicates, such as lithium metasilicate and potassium metasilicate function similarly to the sodium silicates, even though they are less desirable because they are more expensive. All alkali metal silicates with a ratio of 1:1 to 2:1 $M_2O/SiO_2$, (where M is an alkali metal atom) should function similarly and also be suitable.

When sodium metasilicate is used, oxygen generating cores do not melt in an unconstrained manner to form puddles, and they do not collapse even during operation at high environment temperatures. The cores retain their structural integrity and shape during operation of the oxygen generator, and the potential for vibration failure can be avoided. In addition, the need for preformed insulation layers used to increase the mechanical integrity of the operating core can be reduced or eliminated. Sodium metasilicate is also advantageous because it is relatively inexpensive, and is commonly available in a form that is of sufficient chemical purity that it is free from organic contamination that can result in unacceptable levels of carbon monoxide or carbon dioxide contamination in the oxygen produced. Sodium metasilicate can also replace both the calcium hydroxide and glass powder utilized in conventional oxygen generating compositions, allowing a reduction of the number of ingredients to mixed in the oxygen generating compositions, simplifying the weighing and mixing processes. Furthermore, sodium metasilicate is capable of modifying the activity of a catalyst such as cobalt oxide in a manner which avoids reaction in the solid phase, while allowing the catalyst to facilitate the decomposition of the sodium chlorate in the liquid phase. At high temperatures, on the other hand, sodium metasilicate can form a gel network that constrains the melting of the core, to prevent the core from forming puddles or even collapsing.

Chlorate/perchlorate based oxygen generating compositions containing more than 5% and up to about 25% sodium metasilicate produce smoother oxygen flow curves and have lower temperature sensitivity. This reduction in variability of product performance can lead to a higher core manufacturing yield, or can result in lighter core weight with an unchanged manufacturing yield. The cores containing sodium silicate are mechanically more robust and less vulnerable to vibration. The probability of a localized high temperature spot on the generator wall can also be reduced, lowering the maximum wall temperature observed during operation. In combination with iron powder as a fuel, optimal improvement of rheology and structural robustness is provided by a loading of more than 5% of an alkali metal silicate.

It should also be appreciated that a pressing aid such as glass powder or fiber glass can optionally also be used, to facilitate the formation of oxygen generating cores by compacting or molding under pressure.

In forming an oxygen generating core or candle, the metal fuel powder, metal oxide catalyst, sodium silicate modifier, and optionally glass powder (if used) are premixed. The oxygen source chlorate/perchlorate component is typically separately mixed with approximately 1 to 5% water, by weight, used as a lubricant to facilitate the formation of chemical cores or candles. The premixed powder is then mixed with the wet chlorate/perchlorate. The chemical oxygen candles are formed by compaction of the damp mixture in a mold, and are then dried to remove the water that was added during the mixing process.

With reference to FIG. 1, a chemical oxygen generating candle 10 typically has a cylindrical shape, and commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles.

At the top of the candle there is a recess to hold an ignition pellet 12, which can be ignited by firing a percussion primer, for example. The heat from the ignition pellet initiates the decomposition of the layers 14, 16, 18, 20 and 22 of the oxygen generating candle to release oxygen.

The oxygen generating compositions of the invention are further illustrated in the following examples, in which percentages are by weight. In these examples, only some of the layers have more than 5% sodium metasilicate. However, sodium silicate can be used in other layers in a similar way.

EXAMPLE 1

Layer 1: 19.2 grams: 12.0% iron powder, 9.0% cobalt oxide, 4.0% glass powder, and 75.0% $NaClO_3$.

Layer 2: 49 grams: 8.0% iron powder, 0.7% MgO, 1.7% cobalt oxide, and 89.6% $NaClO_3$.

Layer 3: 68.6 grams: 7.5% iron powder, 6.0% $Na_2SiO_3$, 1.7% cobalt oxide, and 84.8% $NaClO_3$.

Layer 4: 117.0 grams: 4.0% iron powder, 10.0% $Na_2SiO_3$, 0.55% cobalt oxide, and 85.4% $NaClO_3$.

Layer 5: 39.2 grams: 2.0% iron powder, 3.0% $Na_2SiO_3$, 0.29% cobalt oxide, 5.0% glass powder, and 89.71% $NaClO_3$.

The powders other than sodium chloride for each layer were premixed. The mixed powder was then mixed with sodium chlorate. A small amount of distilled water was used to wet each mixture. Chemical oxygen candles were then formed through compacting of the damp mixtures in a mold. The candles formed were then dried at 120° C. to remove the water added.

A dried candle was loaded into a stainless steel housing and ignited. The candle operated for 19.4 minutes and generated 83.4 liters of oxygen at room temperature. The reaction was uniform, and the expended candle retained the shape of the unused candle and had very uniform texture with small pores, indicative of a smooth reaction.

EXAMPLE 2

Layer 1: 19.2 grams: 12.0% iron powder, 9.0% cobalt oxide, 4.0% glass powder, and 75.0% $NaClO_3$.

Layer 2: 39.2 grams: 8.0% iron powder, 0.7% MgO, 1.7% glass powder, 1.7% cobalt oxide, and 89.6% $NaClO_3$.

Layer 3: 49.0 grams: 7.5% iron powder, 3.0% $Na_2SiO_3$, 2.0% cobalt oxide, and 87.5% $NaClO_3$.

Layer 4: 49.0 grams: 7.5% iron powder, 6.0% $Na_2SiO_3$, 1.7% cobalt oxide, and 84.8% $NaClO_3$.

Layer 5: 97.5 grams: 4.0% iron powder, 7.0% $Na_2SiO_3$, 0.49% cobalt oxide, and 88.51% $NaClO_3$.

Layer 6: 39.2 grams: 2.0% iron powder, 3.0% $Na_2SiO_3$, 0.29% cobalt oxide, 5.0% glass powder, and 89.71% $NaClO_3$.

An oxygen generating core was formed using these mixtures according to the procedures in Example 1. When loaded into a stainless steel housing and ignited, the candle operated smoothly for 16.6 minutes and generated 84.0 liters of oxygen at room temperature. The shape of the oxygen generating core was retained, and the expended core had a very uniform texture with small pores.

While the oxygen generating cores in Examples 1 and 2 have five and six layers, respectively, chemical cores with fewer than five layers or more than six layers can also be used, and any number of layers can be used to form the oxygen generating candle. The interface shapes and relative sizes and reactivities of the layers can be modified, depending upon the requirements of the specific applications of the oxygen generating candles.

It should be understood that the applications of the formulations in this invention are not limited to aviation, and can extend to, but are not limited, to other uses such as in submarines, diving and mountain climbing, for example, where it is useful to furnish a convenient, reliable supply of oxygen gas of breathable quality.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An improvement in an oxygen generating composition for producing a breathable oxygen gas upon ignition of the composition, the oxygen generating composition comprising about 0.5 to about 15% by weight of an iron metal powder fuel, and about 0.1% to about 15% by weight of a transition metal oxide catalyst, the improvement in said oxygen generating composition comprising:

from 11% to about 25% by weight of an alkali metal silicate as a reaction rate and core rheology modifier and chlorine suppresser; and the remainder substantially comprising an oxygen source selected from the group consisting of alkali metal chlorates, alkali metal perchlorates, and mixtures thereof.

2. The oxygen generating composition of claim 1, wherein said alkali metal silicate is selected from the group consisting of sodium metasilicate, sodium orthosilicate, lithium metasilicate, potassium silicate, and mixtures thereof.

3. The oxygen generating composition of claim 1, wherein said transition metal oxide catalyst is selected from the group consisting of cobalt oxide, copper oxide, nickel oxide, iron oxide, manganese oxide, and mixtures thereof.

4. The oxygen generating composition of claim 1, wherein said transition metal oxide catalyst comprises about 0.1 to 15% by dry weight of the oxygen generating composition and said transition metal oxide catalyst is selected from the group consisting of cobalt oxide, copper oxide and nickel oxide.

5. The oxygen generating composition of claim 1, further comprising a binder selected from the group consisting of glass powder, fiber glass and mixtures thereof.

\* \* \* \* \*